US010504277B1

(12) United States Patent
Haitani et al.

(10) Patent No.: US 10,504,277 B1
(45) Date of Patent: Dec. 10, 2019

(54) COMMUNICATING WITHIN A VR ENVIRONMENT

(71) Applicant: Amazon Technologies, Inc., Seattle, WA (US)

(72) Inventors: Robert Yuji Haitani, Seattle, WA (US); Alaa-Eddine Mendili, Seattle, WA (US); William R. Hazlewood, Seattle, WA (US); Dominick Khanh Pham, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 15/638,051

(22) Filed: Jun. 29, 2017

(51) Int. Cl.
| | |
|---|---|
| *H04N 5/765* | (2006.01) |
| *G06T 15/20* | (2011.01) |
| *H04N 21/466* | (2011.01) |
| *G06F 17/00* | (2019.01) |

(Continued)

(52) U.S. Cl.
CPC ............ *G06T 15/20* (2013.01); *H04N 5/765* (2013.01); *H04N 21/466* (2013.01); *G02B 2027/014* (2013.01); *G06F 17/00* (2013.01); *G06T 15/00* (2013.01)

(58) Field of Classification Search
CPC ............... G06T 2219/024; G06F 3/017; G06F 3/04883; G06F 3/016; G06F 3/167; G06F 1/163; H04M 1/72533; H04M 1/7253; H04M 2250/64; H04M 1/72527; H04M 3/567
See application file for complete search history.

(56) References Cited

U.S. PATENT DOCUMENTS

| | | | |
|---|---|---|---|
| 8,117,550 B1* | 2/2012 | Izdepski | H04M 3/567 379/201.11 |
| 8,223,088 B1 | 7/2012 | Gomez et al. | |

(Continued)

OTHER PUBLICATIONS

Jin et al., Cloud Assisted P2P Media Streaming for Bandwidth Constrained Mobile Subscribers; 2010; IEEE; 6 pages.*

(Continued)

*Primary Examiner* — Linh K Pham
(74) *Attorney, Agent, or Firm* — Kilpatrick Townsend & Stockton LLP

(57) ABSTRACT

Techniques described herein include systems and methods for transforming communications and content from one communication platform to another communication platform such that content can be shared between users utilizing different user devices. In some embodiments, a communication session may be maintained between one or more users where each user is utilizing a different user device. First input may be received from a first communication platform from a first user that is intended to be shared to the one or more users in the communication session. In embodiments, a corresponding communication platform for each user participating in the communication session may be determined based on device information provided by associated user devices of the user when providing previous communications with the communication session and content included in the first input. The first input may be transformed from the first communication platform to one or more different communication platforms.

20 Claims, 8 Drawing Sheets

(51) Int. Cl.
   *G06T 15/00*       (2011.01)
   *G02B 27/01*       (2006.01)

(56) References Cited

U.S. PATENT DOCUMENTS

| | | | | |
|---|---|---|---|---|
| 8,694,585 | B2* | 4/2014 | Turner | A63F 13/12 |
| | | | | 709/204 |
| 8,832,233 | B1 | 9/2014 | Brin et al. | |
| 9,363,569 | B1* | 6/2016 | van Hoff | G06Q 30/0263 |
| 9,530,252 | B2 | 12/2016 | Poulos et al. | |
| 2001/0044725 | A1* | 11/2001 | Matsuda | G06F 3/011 |
| | | | | 704/269 |
| 2004/0015589 | A1* | 1/2004 | Isozu | H04L 29/06027 |
| | | | | 709/227 |
| 2005/0253840 | A1* | 11/2005 | Kwon | G06Q 30/0603 |
| | | | | 345/419 |
| 2006/0271618 | A1* | 11/2006 | Kokubo | H04M 1/72586 |
| | | | | 709/202 |
| 2009/0063970 | A1* | 3/2009 | Steinmetz | G06F 16/25 |
| | | | | 715/706 |
| 2012/0127201 | A1 | 5/2012 | Kim et al. | |
| 2013/0196772 | A1* | 8/2013 | Latta | A63F 13/48 |
| | | | | 463/42 |
| 2015/0365532 | A1* | 12/2015 | Ristock | H04M 3/541 |
| | | | | 379/212.01 |
| 2016/0300387 | A1* | 10/2016 | Ziman | G06T 19/003 |
| 2016/0300388 | A1* | 10/2016 | Stafford | A63F 13/211 |
| 2017/0153698 | A1 | 6/2017 | Bamidele et al. | |
| 2017/0230316 | A1* | 8/2017 | Sharma | G06F 17/2785 |

OTHER PUBLICATIONS

U.S. Appl. No. 15/600,364, filed May 19, 2017, Titled: Virtual Reality Representation of Real World Surroundings.

\* cited by examiner

COMMUNICATING WITHIN A VR ENVIRONMENT

BACKGROUND

Virtual reality (VR) devices can enable a user to explore, interact, and play in a variety of virtual or non-real (e.g., fantasy or sci-fi) environments from the safety and comfort of their own home. Current technologies enable a user to immerse these senses within a virtual reality environment as their eyes, ears, and sometimes even touch senses are stimulated by a VR controller stemming from the virtual reality environment. However, not all users can afford to completely immerse themselves in a virtual world and instead may wish to share their virtual world experience or communicate with users who are not in the same virtual world. Currently, users of virtual reality devices may have to end their immersion in the virtual world in order to communicate with other people. For example, a user may remove a virtual reality device from their face in order to access a mobile phone to call another user in the real world. Further, users of virtual reality devices may find it difficult to share their virtual world experiences with users who are utilizing different devices such as laptop computers or mobile devices.

BRIEF DESCRIPTION OF THE DRAWINGS

Various embodiments in accordance with the present disclosure will be described with reference to the drawings, in which.

DETAILED DESCRIPTION

Figure 1:
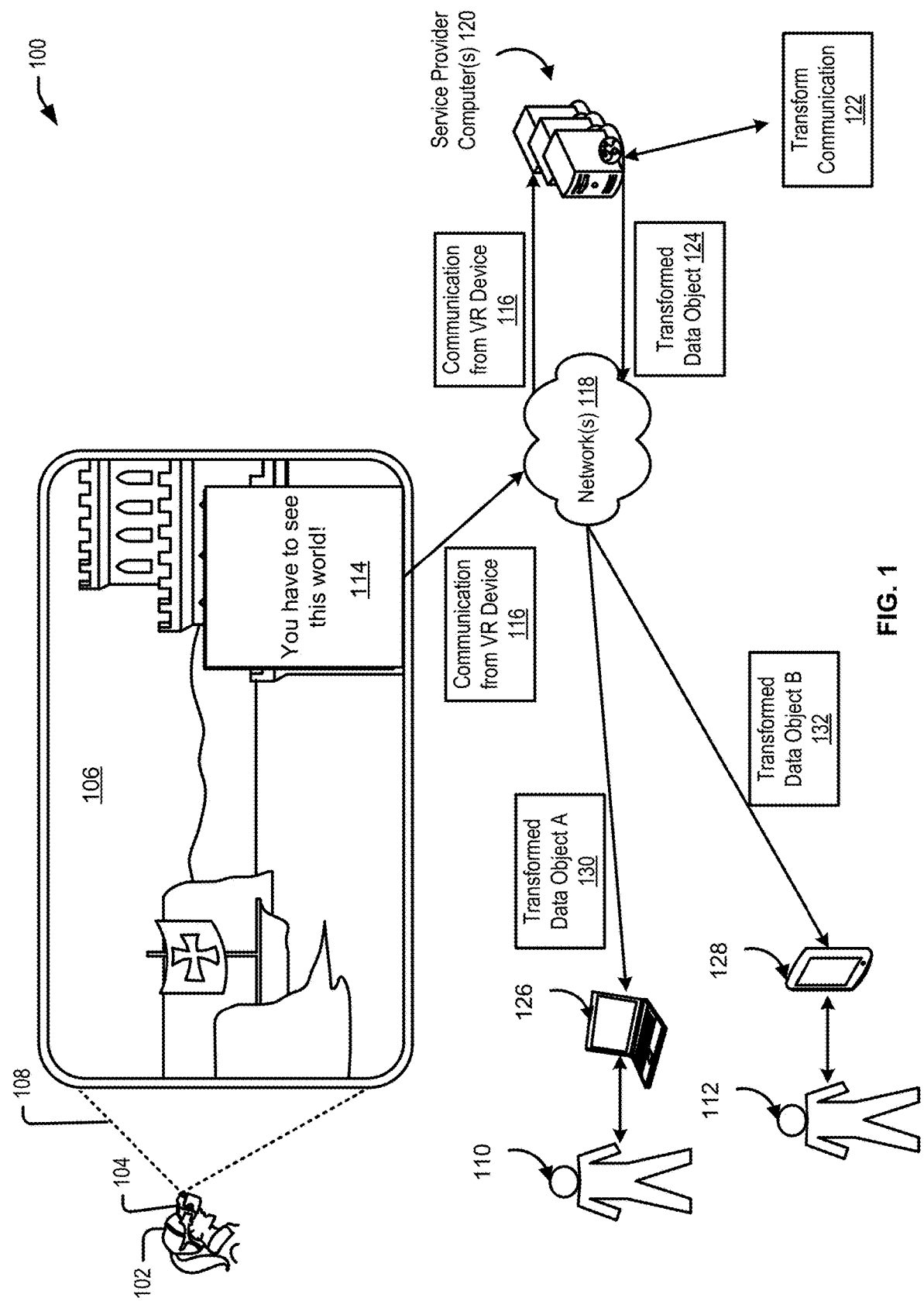
FIG. 1 illustrates a workflow for a communication feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for implementation of a communication feature that enables a user utilizing a communication session of a virtual reality device to share content of a virtual reality environment and/or communicate with other users who are not currently in the same virtual reality environment. In embodiments, the other users of the communication session may be utilizing other computing devices (e.g., non-virtual reality devices) that lack the device capabilities to display a virtual reality environment yet are still able to transmit content utilizing other communication platforms such as a short message service (SMS) text message. The communication feature (e.g., communication sessions) may include identifying a communication platform that is appropriate for communicating content that is shared to the communication session. The content may be transformed to the identified communication platform such that the content can be consumed by various devices being utilized by the participants of the communication session. For example, the content may be transformed from a first data type to a second data type where the first data type was incapable of being processed or displayed by each user device associated with the users participating in a communication session. As used herein, a communication platform includes a content type and/or media type associated with a communication intended to be shared to a communication session that can be properly consumed by a device supporting the communication platform. For example, a mobile phone may support communication platforms of SMS text messaging, static images, or audio files, but is incapable of supporting a communication platform of live streaming virtual reality environments. Communications or content provided to the communication session may be transformed or altered to a different media type or degraded to a simpler media type that enables the various users using different computing devices to still participate and consume the content included in the communication session.

Communications or content provided to the communication session may be transformed to a data object of a different media type such that the content of the data object may be properly consumed, interacted with, or viewed by a user of the communication session. For example, a data object of an image or movie may be generated and provided to the user of a virtual reality device such that the data object is presented within the virtual reality environment thereby enabling the user to remain immersed in the virtual reality environment. Similarly, the user of the virtual reality device can provide input, either in the virtual reality environment or the real world, to initiate a communication session, identify parties to join the communication session, and communicate content such as an audio clip of their voice or a live stream of their virtual reality environment to the communication session. For example, a user may engage in certain gestures within the real world and/or virtual environment to initiate a communication session, such as by interacting with a user interface presented in the virtual world or providing audio commands such as "start a communication session" that is received by a corresponding microphone. A corresponding virtual reality device of the user or a server computer configured to implement the communication features described herein may maintain the communication session, identify appropriate communication platforms, transform the content, and transmit the content to the user devices of participants of the communication session. Thus, the user is able to maintain the immersion of the virtual reality environment while still being able to communicate with users in the real world or other virtual reality environments without having to remove or disconnect from the virtual reality device.

In accordance with at least one embodiment, the communication features described herein include maintaining a communication session such that participants may leave and join the communication session and consume content provided to the communication session using different devices. For example, a first user may have intended to share a live stream of a virtual reality environment to the communication session. Another user who is participating in the communication session may be utilizing a mobile device incapable of streaming the virtual reality environment and instead may be presented with a still image or picture of the virtual reality environment. At a later time, the same user may switch devices from the mobile device to a desktop computer. The user may use the desktop computer to interact with the communication session and browse to content that was previously incapable of being consumed in the original intended format (i.e., the live stream of the virtual reality environment). The communication session may archive or maintain the original content form or media type shared by the virtual reality user such that users may consume the same content in a different media type format as they transition computing devices while still participating in a communication session. Timestamp information may also be provided for each communication shared to the communication session for easier browsing and searching by users of the communication session. For example, when transitioning user devices the users may use the timestamp information to search for particular communications in an attempt to consume communications in the intended or originally shared format. In embodiments, the communication features described herein include associating and maintaining one or more user preferences for a communication session that identify a preferred communication platform for the system to utilize when communicating content to a user device associated with a user. In embodiments, a user may be queried or provide input that indicates a communication platform for the system to utilize prior to communicating the content in a communication session. For example, a user may indicate that all incoming content no matter the original media type or file type should be transformed or degraded to another communication platform such as text messages, audio clips, or video formats.

In accordance with at least one embodiment, the communication features described herein include determining or identifying an appropriate communication platform to share content or communications provided to a communication session based on the type of content provided and the device capabilities of participating users. Users of the communication session may be queried for their device capabilities obtained based on previous communications to the communication session, or otherwise identified using device information such as device identifiers or application identifiers to determine an appropriate communication platform. In some cases no transformation may be necessary as a communication content type may be able to be shared as-is to each user device of the communication session. For example, an SMS text message may be easily consumed by all participating user devices of users in the communication session. In other use cases, content may be transformed multiple times into different data objects based on the user devices of participating users in an attempt to best properly share the communication provided in the communication session. For example, a live stream of a virtual reality environment may be transformed into a short video clip for one user, an audio only clip for another user, and a still image for yet another user based on their respective device capabilities.

As an illustrative case, a user using a virtual reality device may be exploring a virtual reality environment meant to represent a large jungle park infested by dinosaurs that have escaped their cages. The user may wish to share this experience with several of their friends. The user may provide an audio command such as "share this experience with Joey, Chandler, and Ross." The audio command may be obtained by a microphone of the virtual reality device or an external input device such as an external microphone in communication with the virtual reality device. In response to the command, the virtual reality device may initiate a communication session and invite the intended users to the communication session. A data object of a live stream of the virtual reality environment jungle park may be generated and shared to the communication session. Subsequently, as the other users join the communication session, device information of devices used by the other users may be obtained by the communication feature implemented by the virtual reality device and used to transform the data object into additional data objects of different media types. For example, Joey may be utilizing a mobile phone that can present a video clip but not an entire live stream of a virtual reality environment, whereas Chandler is using a desktop computer that can easily consume the live stream data object so no transformation is necessary. The data object of the live stream of the virtual reality environment may be transformed and provided to Joey, Chandler, and Ross using the appropriate communication platforms thereby enabling all the users of the communication session to consume the content to the best of the device capabilities.

The processes and systems described herein may be an improvement on conventional virtual reality devices and communications to and from virtual reality devices and/or virtual reality environments presented therein. For example, conventional virtual reality devices may lack the capability for enabling the user interacting with a virtual reality environment presented in the virtual reality device to communicate with others users using different computer devices whether sending or receiving communications. Further, conventional virtual reality devices and communication platforms may lack the capacity to determine an appropriate communication platform best suited for sharing the content or communication shared in a communication session. For example, systems and methods described herein determine an appropriate communication platform and media type to transform content to or from in order to enable users utilizing different computer devices to participate in the communication session and consume the shared content in some form. The improvements described herein can enable users of virtual reality devices to maintain the immersion obtained by interacting with a virtual reality environment while still being able to communicate with other users in other virtual reality environments or the real world.

FIG. 1 illustrates a workflow for a communication feature, in accordance with at least one embodiment. The workflow 100 of FIG. 1 depicts a user 102 utilizing a virtual reality device 104 to interact with a virtual reality environment 106 that is displayed 108 to the user 102 via the virtual reality device 104. In the workflow 100 the user 102 may wish to share the virtual reality experience or environment 106 with one or more other users, such as users 110 and 112. In embodiments, the users 102, 110, and 112 may already be participating in a communication session that was previously initiated by user 102. The processes of initiating a communication session are described in more detail below in FIG. 3. In accordance with at least one embodiment, the user 102 may interact or provide input within the virtual reality environment 106 to share content or a communication 114 to the users 110 and 112 of the communication session. In embodiments, the user 102 may be enabled to provide a tag or description with the communication or content they are providing to the communication session. For example, in the workflow 100 of FIG. 1, the user 102 may be providing a description (114) of the virtual reality environment 106 that will form the content of the communication shared in the communication session. As another example, a user can provide a description or tag for links to videos, live streams, or audio clips shared in the communication session.

The workflow 100 includes the virtual reality device 104 transmitting the communication from the VR device 116, via networks 118, to service provider computer(s) (service provider computer) 120. In embodiments, the service provider computer 120 may be configured to implement the communication features described herein including maintaining the communication session, determining an appropriate communication platform, and transforming the content from one media type to another which may include generating a new data object using data or information from another shared data object. Although FIG. 1 illustrates the service provider computer 120 performing certain tasks within the workflow 100, embodiments described herein include the virtual reality device 104 being configured to perform the same or similar tasks illustrated in FIG. 1 for the communication features described herein. The workflow 100 includes the service provider computer 120 transforming the communication 122 to a transformed data object 124. In accordance with at least one embodiment, the service provider computer 120 may transform the communication 122 based on device information of user devices 126 and 128 for users 110 and 112 such that the communication from the VR device 116 may be properly consumed by the user devices 126 and 128 for presentation to users 110 and 112.

In embodiments, the transformation of the communication 122 may also be based on the content or content type associated with the communication from the VR device 116. For example, if the user devices 126 and 128 are capable of consuming the content included in the communication from the VR device 116 (i.e., the devices include capabilities to consume the content as is) then no transformation of the communication may occur. Instead, the service provider computer 120 may simply convey the content to the communication session which is presented to users 110 and 112 via user devices 126 and 128. The workflow 100 of FIG. 1 depicts the transformed data object 124 being transmitted, via networks 118, to user devices 126 and 128 for display and presentation to users 110 and 112. As described herein, based on a type of content or format of the content included in communication from VR device 116 and the device information (e.g., device capabilities of user devices 126 and 128), multiple data objects or transformations may be performed by the service provider computer 120 such that a transformed data object A 130 is transmitted to user device 126 and a transformed data object B 132 is transmitted to user device 128.

In accordance with at least one embodiment, responses from users 110 and 112 utilizing user devices 126 and 128 to the communication session may be generated into data objects that are incorporated into the virtual reality environment 106 for consumption, interaction, and viewing by user 102 using the virtual reality device 104. In embodiments, the data object may be intelligently placed or displayed to the user 102 in virtual reality environment 106 based on information from the virtual reality environment 106 itself, such as a state of the virtual reality environment or a user specified context of the virtual reality device/environment. For example, a state or user specified context of the virtual reality environment may indicate a certain mode of the environment such as a rest or home mode where communications from the communication session can take front and center view within the virtual reality environment. Yet another state or user specified context may indicate active input being provided by the user 102 identifying that the user is currently busy interacting with the environment, such as in the middle of a game (e.g., running away from a dinosaur), and the communications may be suppressed or displayed in an innocuous manner, such as in the corner of a heads up display (HUD).

Figure 2:
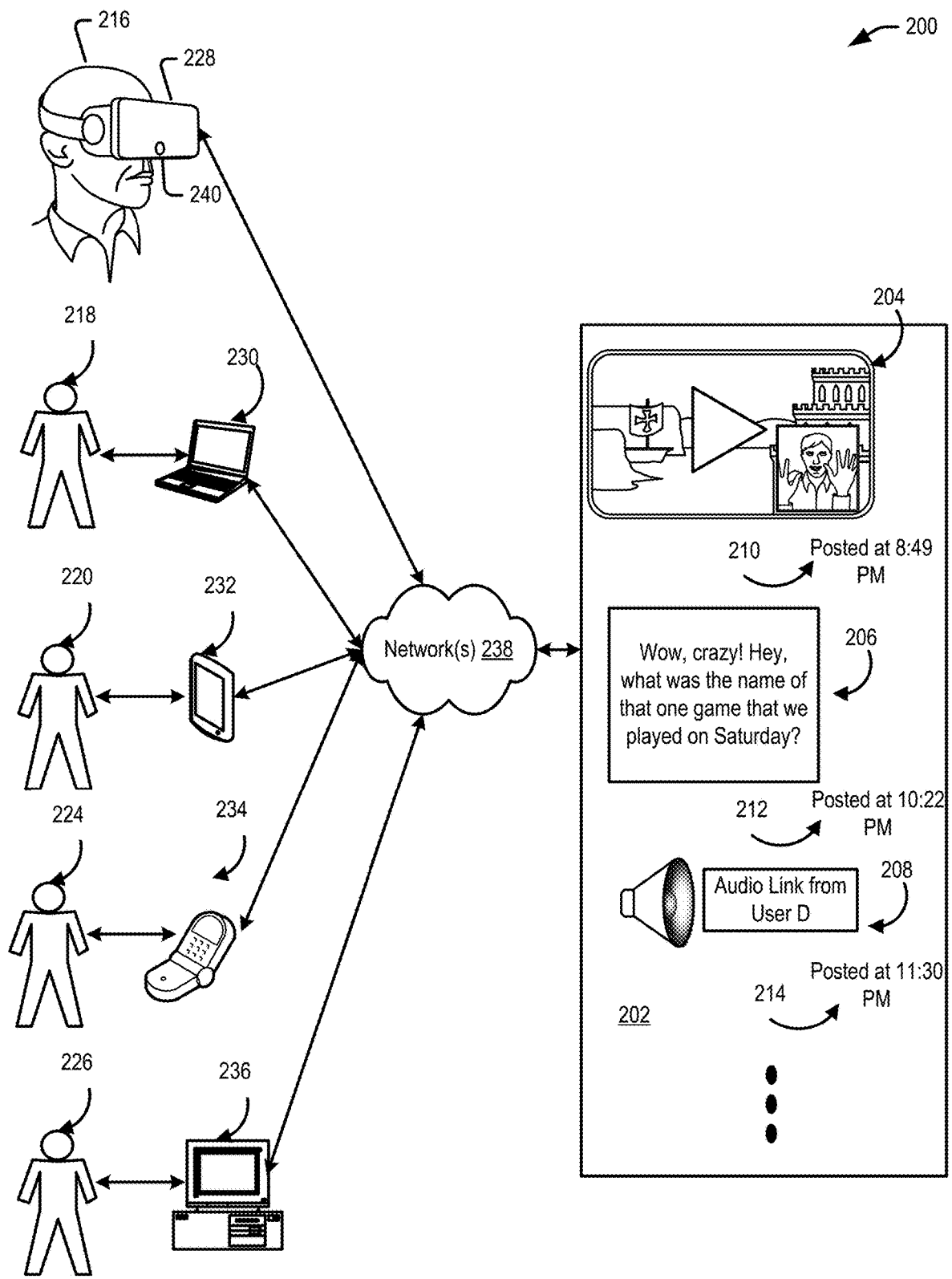
FIG. 2 illustrates a workflow for a communication feature that includes multiple users utilizing different computer devices to consume and share content in a communication session, in accordance with at least one embodiment.

FIG. 2 illustrates a workflow for a communication feature that includes multiple users utilizing different computer devices to consume and share content in a communication session, in accordance with at least one embodiment. The workflow 200 of FIG. 2 illustrates an ongoing communication session 202 that further includes one or more communications 204, 206, and 208 each with corresponding timestamps 210, 212, and 214 or information that identifies when the content was shared to the communication session. Each of the communications 204, 206, and 208 may have been shared or provided by any of users 216, 218, 220, 222, 224, or 226 using virtual reality device 228 or computing devices 230, 232, 234, and 236. The workflow 200 includes the content 204, 206, and 208, being shared and consumed by the users 216-226 via a network 238 such as the internet. In accordance with at least one embodiment, each of the communications 204, 206, or 208 may be transformed into a new data object or changed from one media type to another prior to being consumed or transmitted to user devices 230-236 or virtual reality device 228. For example, the initial communication 204 may have been provided by user 216 using virtual reality device 228 and represent a video clip of a virtual reality environment being displayed by virtual reality device 228 to user 216.

As described herein, user devices 230 and 236 may be capable or contain device capabilities of viewing the video content 204 and thus no transformation may occur. However, devices 232 and 234 may be incapable of viewing such content such that when users 220 and 224 utilize devices 232 and 234 to interact or consume content 204 a transformation may occur to reduce, degrade, or transform the content to a different communication platform or media type capable of being consumed by the devices 232 and 234 (e.g., a static image derived from the video clip). In embodiments, a service provider computer implementing the communication features described herein may maintain or associate multiple content types or data objects for each communication provided to the communication session, including the original content type or data object. This is so that when users transition from a first computer device incapable of consuming the media type or content type originally intended by the communication provider to a second computer device capable of consuming the intended media type or content type the user may attempt to consume the content in the intended format. In embodiments, the service provider computer may archive communication sessions for later viewing, interaction, or participation by the users 216-226. In embodiments, the timestamps aid the user in browsing or searching through archived or on-going communication session to re-consume content or attempt to consume content in the intended media format or data type intended by the providing user. In embodiments, an external input device (such as a microphone communicatively coupled to the virtual reality device 228) or an input device associated with a user device such as front facing camera 240 of virtual reality device 228 may be utilized to capture or obtain input intended to be shared to the communication session 202. In accordance with at least one embodiment, the communications features described herein include generating a private or a public communication session. A private communication session may include certain entities and may be transitioned to a public communication session that includes more or different entities than originally intended in the private communication session. When a communication session transitions from a private communication session to a public communication session, newly joining users may be prohibited from viewing content shared in the previously private communication session but will have access to all content communicated to the session upon being transitioned to a public communication session. A user who initiates a communication session may provide input that designates a communication session as public or private.

Figure 3:
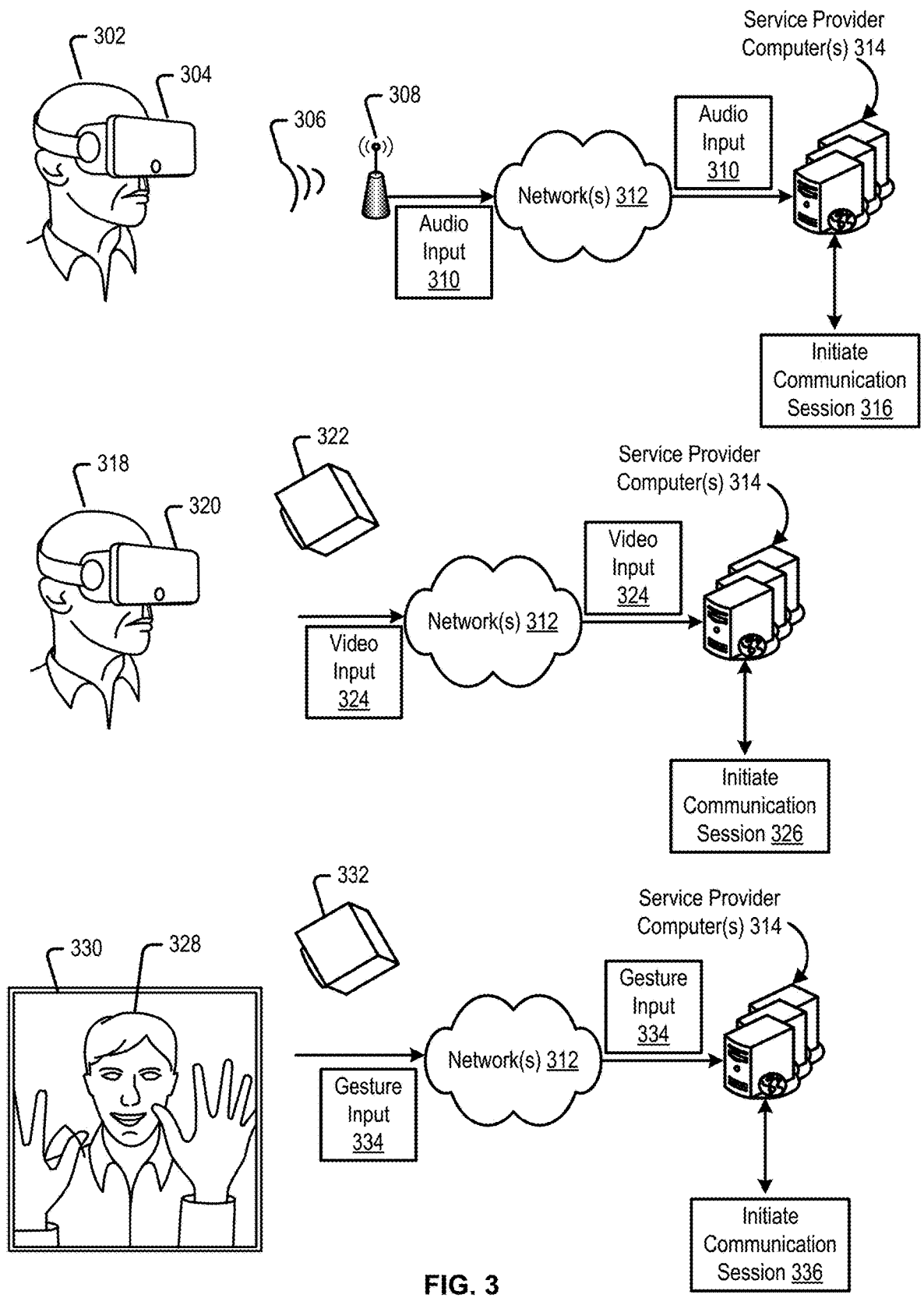
FIG. 3 illustrates some examples for initiating a communication session, in accordance with at least one embodiment.

FIG. 3 illustrates some examples for initiating a communication session, in accordance with at least one embodiment. FIG. 3 depicts a user 302 using a virtual reality device 304 to view and interact with a virtual reality environment (not pictured) presented or displayed by the virtual reality device 304. In embodiments, the user 302 may wish to initiate a communication session with one or more users. As an example, the user 302 may provide input in the form of an audio command or audio input 306 to an external input device 308. In FIG. 3, the external input device 308 includes a microphone that is configured to record or capture audio 306 provided by the user 302 and communicate the audio input 310, via networks 312, to the service provider computer 314. In embodiments, the external input device 308 may be configured to perform a speech to text operation that captures audio information and parses words to text using speech to text algorithms. In accordance with at least one embodiment, the service provider computer 314 may be configured to parse the audio input for one or more entities or users to invite to an initiated communication session. Certain audio commands may be provided by the user 302 to initiate a communication session, add users to a communication session, remove users from a communication session, or end a communication session. FIG. 3 includes service provider computer 314 initiating the communication session 316 with the one or more identified users based on the audio input 310 provided by user 302. Thus, the user 302 is able to maintain the immersion provided by the virtual reality device 304 while still attempting to communicate with other users in the real world. It should be noted that although FIG. 3 includes an external input device 308 an input device associated with virtual reality device 304 may be configured to perform similarly (e.g., a corresponding microphone or video camera coupled to the virtual reality device 304).

FIG. 3 also depicts user 318 using virtual reality device 320 to view and interact with a virtual reality environment (not pictured) presented or displayed by the virtual reality device 320. In embodiments, the user 318 may wish to initiate a communication session with one or more users or communicate content to the communication session already in progress. Similar to the above noted process, an external input device 322, such as a video camera, may be configured to record or obtain video input 324 provided by the user 318 for sharing to a communication session or for parsing to initiate a communication session. In embodiments, the video input 324 may be provided to service provider computers 314 via networks 312 to initiate a communication session 326 or provide content to a communication session already in progress. The external input device 322 may include a microphone that is configured to pick up audio commands such as audio 306 to initiate a communication session 326 and also record content that is to be included in the initiated communication session 326 such as seed content for the session. For example, the user 318 may recite "begin a communication session with Joey and say 'you have to play this game.'" The phrase "you have to play this game" may represent the seed or initial communication provided in the communication session.

FIG. 3 also includes a user 328 gesturing in a space 330 that is captured by an external input device 332 such as a video camera, an infrared sensor, a time-of-flight sensor, or a motion detection sensor that is configured to capture and/or obtain gesture input 334. Similar to the processes described above, the external input device 332 may be configured to transmit, via networks 312, the gesture input 334 to the service provider computer 314 for use in initiating a communication session 336. In embodiments, the service provider computer 314 may be configured to interpret or identify certain commands from the gesture input 334 transmitted by external input device 332. The gesture input 334 may include content that is intended to be shared by the user 328 to a communication session already in progress. The service provider computer 314 may be configured to parse the gesture input to identify a share command and share a video feed or video capture obtained by external input device 332 as a result of the gesture input 334.

Figure 4:
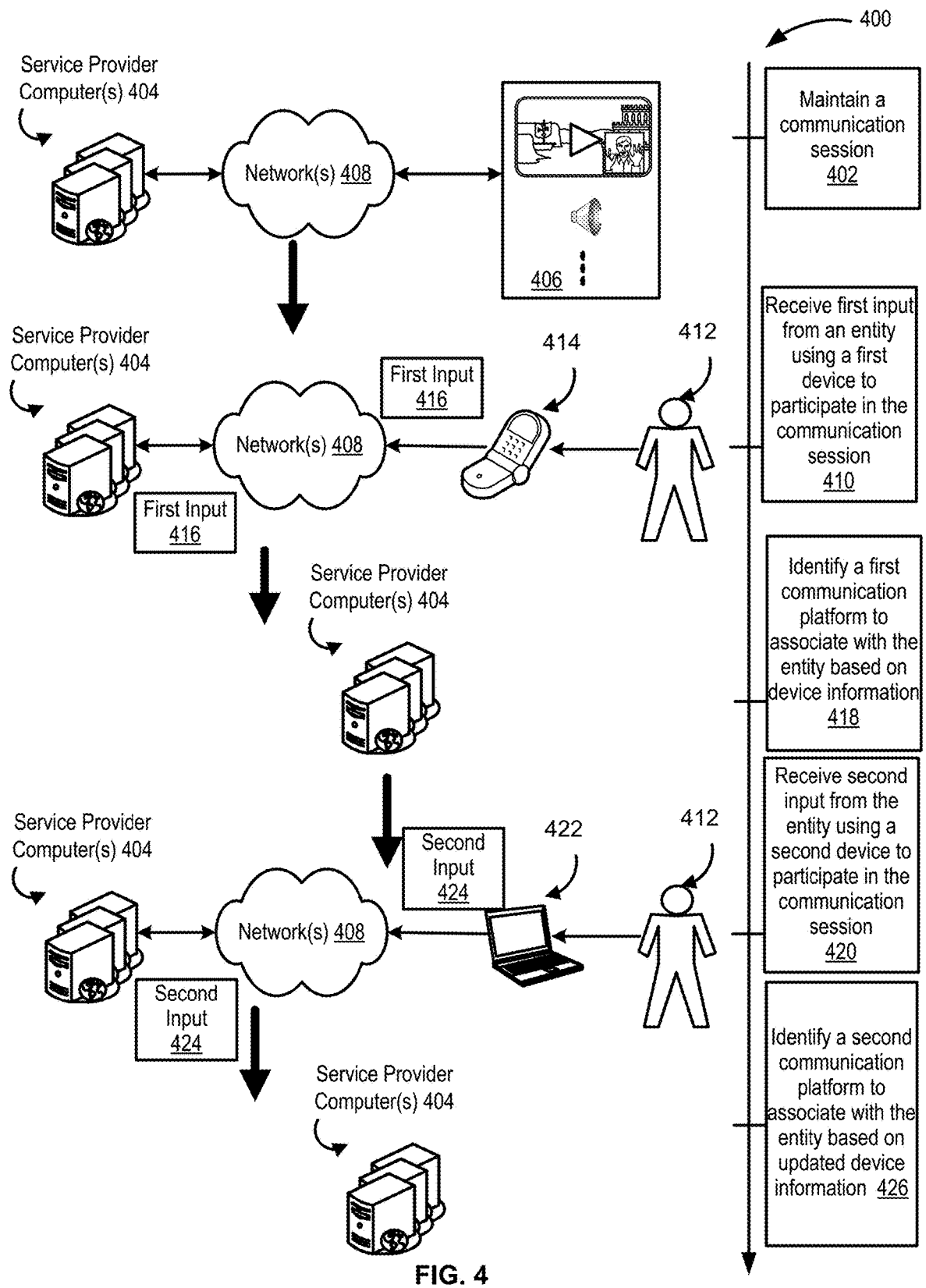
FIG. 4 illustrates a workflow for a communication feature that includes a transition of a user from one computing device to another for participating in the communication session, in accordance with at least one embodiment.

FIG. 4 illustrates a workflow for a communication feature that includes a transition of a user from one computing device to another for participating in the communication session, in accordance with at least one embodiment. The workflow 400 of FIG. 4 includes maintaining a communication session at 402. For example, a service provider computer 404 may maintain a communication session 406 and provide content to and from the communication session or provide access to the communication session to one or more user devices associated with participating users via networks 408. The workflow 400 may include receiving first input from a participating entity using a first device intended for the communication session at 410. For example, user 412 may use user device 414 to provide first input 416 to the service provider computer 404 via networks 408. In embodiments, the first input may include a text message or a picture captured by user device 414 and intended to be shared to the maintained communication session 406 for consumption by other users. In accordance with at least one embodiment, the first input 416 may be associated with or may include device information of user device 414. For example, the device information may include a hardware identifier, a media access controller address (MAC address), or application specific information such as information provided by an application associated with the first input 416 (application name, version, content type, etc.).

The workflow 400 may include identifying a first communication platform to associate with the entity based on the device information at 418. For example, the service provider computer 404 may be configured to identify or determine an appropriate communication platform or content type to transform the first input for best proliferation or consumption by other parties in the communication session. Further, the service provider computer 404 may maintain and update associated communication platforms for each user device and user in the communication session for efficient transformations of content included in subsequent communications. In embodiments, determining the communication platform can be based on a type of content provided and the device information associated with the type of content. The workflow 400 can include receiving second input from the entity using a second device to participate in the communication session at 420. This is to illustrate a use case where the same user has transitioned from a first user device or computing device to a second and different user device or computing device with different device capabilities, whether they be increased or decreased device capabilities.

For example, a user may switch from utilizing a mobile device to participate in the communication session while they commute home from work to a desktop computer once they arrive home. The workflow 400 illustrates user 412 using user device 422 to transmit second input 424, via networks 408, to the service provider computer 404. The second input 424 may include updated device information associated with user device 422 to enable the service provider computer 404 to identify an appropriate communication platform to associate with the user 412. The workflow 400 may include identifying a second communication platform to associate with the entity based on updated device information at 426. For example, similar to the identifying of the first communication platform at 418, the second communication platform may be identified or determined by the service provider computer 404 based on the device information associated with the second input 424 and the content of the second input 424. In embodiments, the service provider computer 404 may be configured to update the communication session to associate the second communication platform with user 412 for use in efficiently transmitting subsequent communications to and from the communication session to the user 412 and user device 422.

Figure 5:
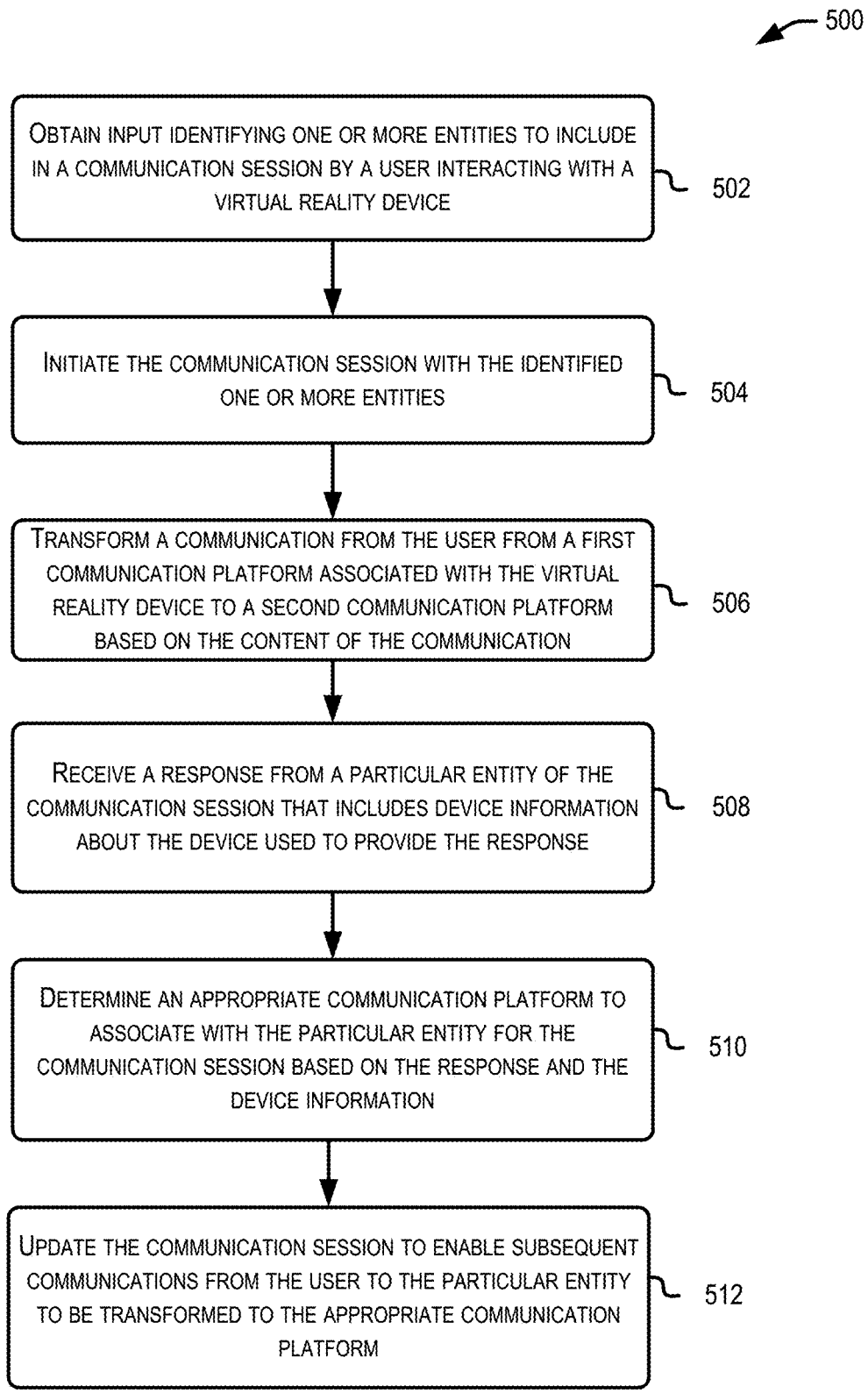
FIG. 5 illustrates an example flowchart for a communication feature, in accordance with at least one embodiment.
Figure 6:
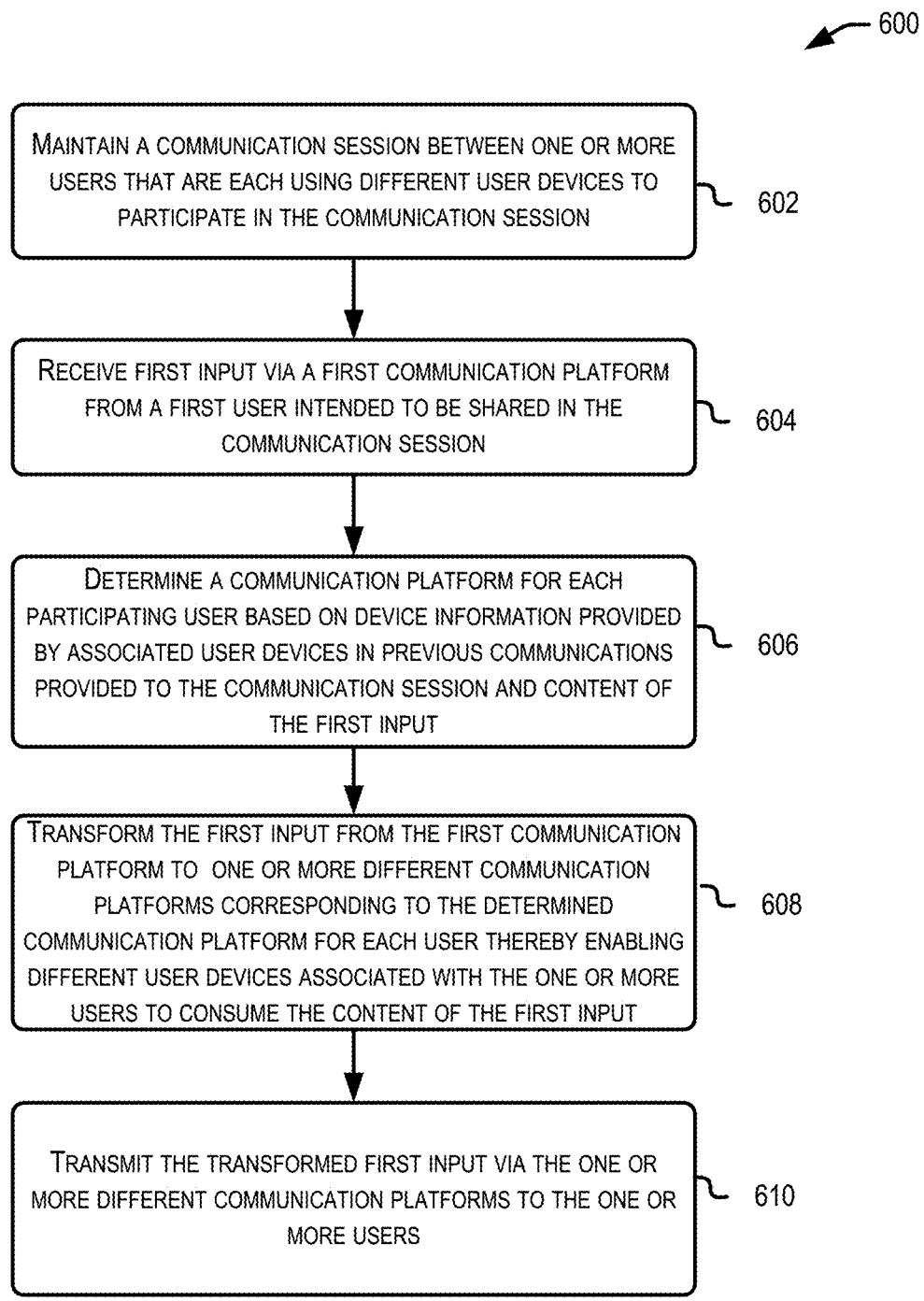
FIG. 6 illustrates an example flowchart for a communication feature, in accordance with at least one embodiment.

FIGS. 5 and 6 illustrate example flow charts for a communication feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the processes (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, service provider computer (service provider computers 120, 314, 404, and 714 and/or virtual reality device 102, 228, 304, 320, and 704) utilizing at least the communication module 730 depicted in FIGS. 1-4 and 7 may perform the processes 500 and 600 of FIGS. 5 and 6. In FIG. 5, the process 500 may include obtaining input identifying one or more entities to include in a communication session by a user interacting with a virtual reality device at 502. For example, the user interacting with the virtual reality device may provide audio commands or gestures which are captured by input devices associated with the virtual reality device or external to the virtual reality device to initiate a communication session. The user may also provide input within a virtual reality environment presented by the virtual reality device to initiate a communication session such as by interacting with a user interface presented in the virtual reality environment to select the intended entities and begin the communication session.

The process 500 may include initiating the communication session with the identified one or more entities based on the input at 504. For example, a notification in the form of an email, an application notification, a SMS text, or other suitable communication avenues may be utilized to invite users to the communication session. The notification may be configured to link or enable the user to join the communication session. The process 500 may include transforming a communication from the user from a first communication platform associated with the virtual reality device to a second communication platform based on the content of the communication at 506. In embodiments, the user of the virtual reality device may wish to share or stream the presented virtual reality environment, provide an image of the virtual reality environment, or merely provide a text message to the users of the communication session. However, depending on the device capabilities of the devices being utilized by the other users of the communication session and the content of the communication, an appropriate communication platform must be determined for each user so that each user can properly consume the communication.

The process 500 may include receiving a response from a particular entity of the communication session that includes device information about the device used to provide the response at 508. In embodiments, the process 500 may include determining an appropriate communication platform to associate with the particular entity for the communication session based on the content of the response and the device information at 510. By determining and associating a communication platform with each entity subsequent communications to and from the communication session can be made more efficient as the service provider computer and/or virtual reality device transform the communications or, generate new data objects that represent the communication for proper consumption by the various computing devices utilized by the users of the communication session. The process 500 may conclude at 512 by updating the communication session to enable subsequent communications from the user to the particular entity to be transformed to the appropriate communication platform. As described herein, based on the device information and the content type or media format associated with a particular communication, no transformation may be necessary to properly proliferate the communication to participating entities of the communication session.

The process 600 of FIG. 6 may include maintaining a communication session between one or more users that are each using different user devices to participate in the communication session at 602. The process 600 of FIG. 6 may include receiving first input via a first communication platform from a first user intended to be shared in the communication session at 604. In examples, the first communication platform may include a device type and/or media type or format associated with the first input. The first input may represent a communication from the first user that they wish to share for consumption to other users within the communication session. The process 600 of FIG. 6 may include determining a communication platform for each participating user based on device information provided by associated user devices in previous communications provided to the communication session and content of the first input at 606. The device information may be utilized by the service provider computer implementing the communication features described herein to determine or identify the device capabilities of the communicating device. For example, the service provider computer may use the device information to identify that a participating mobile device includes a front facing camera, text capabilities, and wireless internet/Bluetooth capabilities.

The process 600 of FIG. 6 may include transforming the first input from the first communication platform to one or more different communication platforms corresponding to the determined communication platform for each user participating in the communication session at 608. This will enable different user devices associated with the one or more users participating in the communication session to consume the content of the first input to the best of their device capabilities. For example, a mobile phone device displaying a static image derived from a live stream virtual reality experience. The process 600 may conclude at 610 by transmitting the transformed first input via the one or more different communication platforms to the one or more users of the communication session. As described herein, transforming the first input may include generating a new data object that uses the content of the first input but is formatted to a different data type and/or media type for consumption by a wider range of user devices and/or computing devices.

Figure 7:
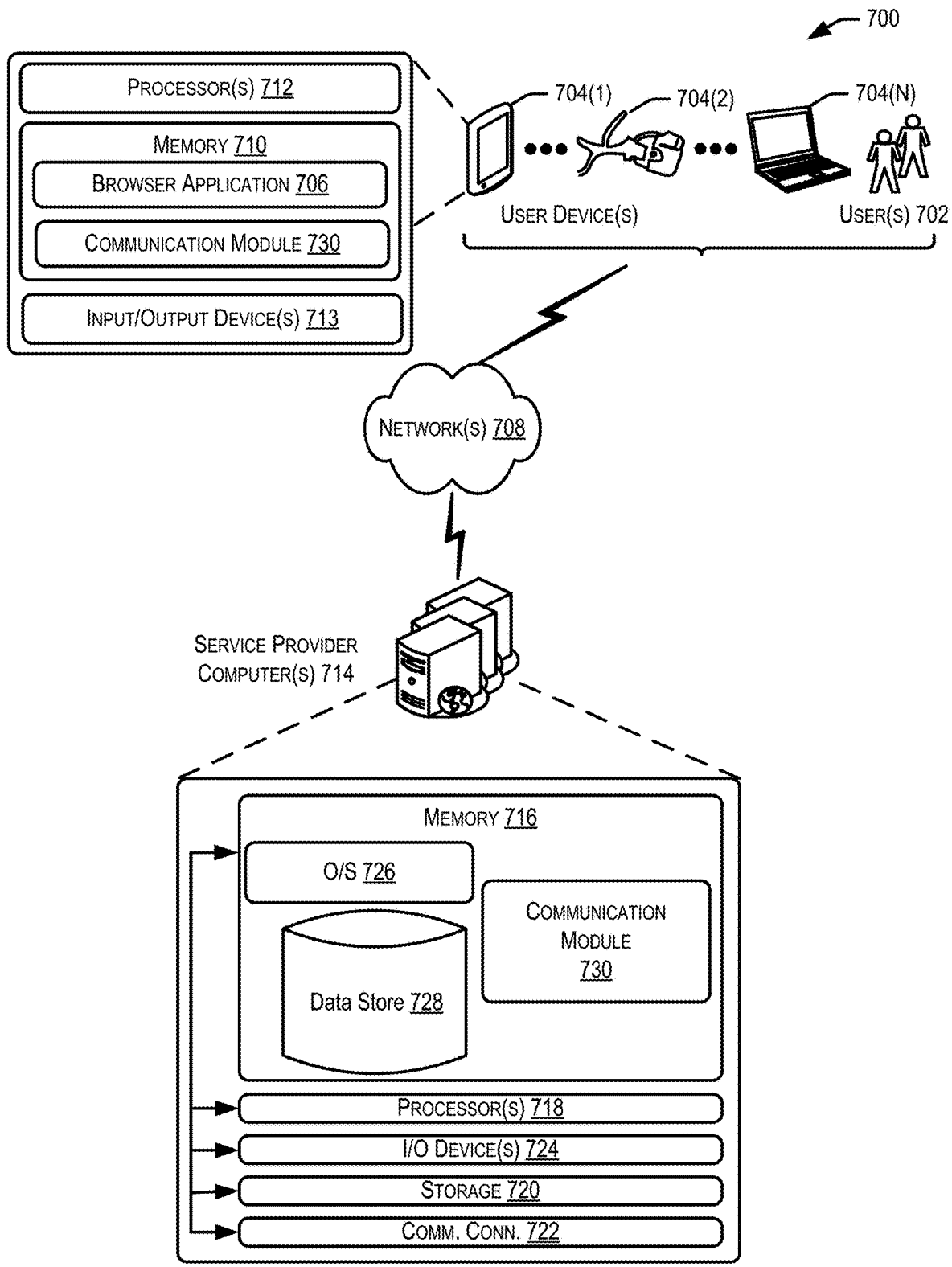
FIG. 7 illustrates an example architecture for implementing a communication feature, in accordance with at least one embodiment.

FIG. 7 illustrates an example architecture for implementing a communication feature, in accordance with at least one embodiment. In architecture 700, one or more users 702 may utilize user computing devices 704(1)-(N) (collectively, user devices 704 including a virtual reality device) to access a browser application 706 or a user interface (UI) accessible through the browser application 706 or other suitable software application such as a virtual reality environment simulator, via one or more networks 708 to provide, display, or present a virtual reality environment and data object that represents a communication to and from a communication with other users participating in a communication session, as described herein. The "browser application" 706 can be any browser control or native application that can access and display a virtual reality environment, data objects, and real-time camera feed such as a user interface of a native software application for enabling the presentation, display, and interaction of a virtual reality environment. The "browser application" 706 or native application may be configured to receive and transmit various content and communications from users 702 utilizing different user devices 704 to a communication session as well as present, display, or otherwise consume content and communications provided by other users 702 using other and different user devices 704. A native software application may include an application or program that has been developed for use on a particular platform (such as an operating system) or a particular device (such as a particular type of virtual reality device or user device 704). In embodiments, the user device 704 may include one or more components for enabling the user 702 to provide input such as input for interacting with the virtual reality environment, data objects, initiating a communication session as well as generating communications for transmittal to a communication session for consumption by other users.

The user devices 704 may include at least one memory 710 and one or more processing units or processor(s) 712. The memory 710 may store program instructions that are loadable and executable on the processor(s) 712, as well as data generated during the execution of these programs. Depending on the configuration and type of the user devices 704, the memory 710 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 710 may include multiple different types of memory, such as static random access memory (SRAM), dynamic random access memory (DRAM), or ROM. The memory 710 may also include a communication module 730 configured to implement the transformation/generation of data objects representing communications and content provided to a communication session as well as identifying or determining an appropriate communication platform to communicate the transformed/generated data objects or communications for consumption by different user devices participating in the communication session. The user devices 704 may include input/output devices 713 configured to obtain input information such as video input information, audio input information, motion detection sensor input information, flight-of-time sensor information, and infrared information. The input information may be utilized by the communication module 730 to generate a communication such as a data object intended to be communicated and presented to the other users participating in a communication session as well as initiating the communication session as described herein.

Turning to the contents of the memory 710 in more detail, the memory 710 may include an operating system and one or more application programs or services for implementing the features disclosed herein. Additionally, the memory 710 may include one or more modules for implementing the features described herein including the communication module 730.

The architecture 700 may also include one or more service provider computers 714 that may, in some examples, provide computing resources such as, but not limited to, client entities, low latency data storage, durable data store, data access, management, virtualization, hosted computing environment or "cloud-based" solutions, electronic content performance management, etc. The service provider computers 714 may implement the communication features described herein, and implement or be an example of the service provider computer(s) 120, 314, and 404 of FIGS. 1, 3, and 4. The one or more service provider computers 714 may also be operable to provide site hosting, computer application development, and/or implementation platforms, combinations of the foregoing, or the like to the one or more users 702.

In some examples, the networks 708 may include any one or a combination of many different types of networks, such as cable networks, the Internet, wireless networks, cellular networks, and other private and/or public networks. While the illustrated examples represents the users 702 communicating with the service provider computers 714 over the networks 708, the described techniques may equally apply in instances where the users 702 interact with the one or more service provider computers 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 714 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 714 may be in communication with the user device 704 via the networks 708, or via other network connections. The one or more service provider computers 714 may include one or more servers, perhaps arranged in a cluster or as individual servers not associated with one another.

In one illustrative configuration, the one or more service provider computers 714 may include at least one memory 716 and one or more processing units or processor(s) 718. The processor(s) 718 may be implemented as appropriate in hardware, computer-executable instructions, firmware, or combination thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more service provider computers 714, the memory 716 may be volatile (such as RAM) and/or non-volatile (such as ROM, flash memory, etc.). The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more service provider computers 714 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 714. Combinations of any of the above should also be included within the scope of non-transitory computer-readable media.

The one or more service provider computers 714 may also contain communication connection interface(s) 722 that allow the one or more service provider computers 714 to communicate with a data store, another computing device or server, user terminals, and/or other devices on the networks 708. The one or more service provider computers 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including the communication module 730. In accordance with at least one embodiment, the communication module 730 may be configured to at least obtain and/or receive input, representing content or communications, from one or more user devices 704 (such as a virtual reality device) for use in generating a data object and/or transforming a data object from one content type or media type format to another for proper transmittal and consumption by other users participating in a communication session and using different user devices 704 with different device capabilities.

Figure 8:
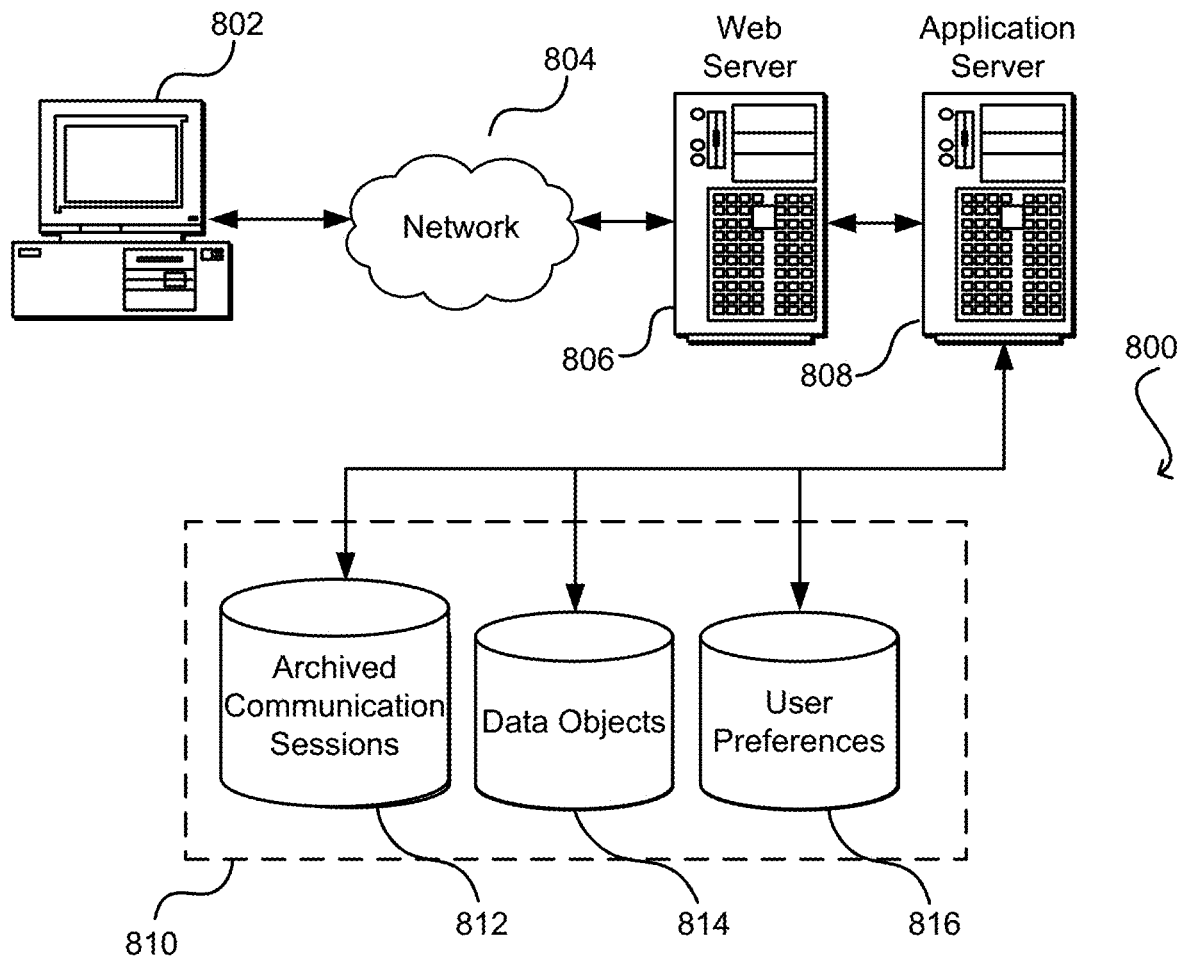
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect of the current disclosure. For example, the data store illustrated includes mechanisms for storing archived communication sessions 812 and user preferences 816, which can be used to serve content for the production side or to enable access by users to communication sessions which they have previously participated in or were invited to join. Further, the user preferences 816 can be utilized by the service provider computers or web server 806 and application server 808 to identify an appropriate communication platform to share content from a communication session. The data store also is shown to include a mechanism for storing data objects 814, which can be used for transforming communications and content shared in a communication session such that users participating in the communication session can attempt to consume the content of a communication in some form. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A computer-implemented method, comprising:
obtaining, by a virtual reality device, input identifying one or more entities to include in a communication session, the input provided by a user interacting with the virtual reality device and obtained by an input device associated with the virtual reality device;

initiating, by the virtual reality device, the communication session with the identified one or more entities based at least in part on the input;

transforming, by the virtual reality device, a communication from the user from a first media type of a first communication platform associated with the virtual reality device to a second media type of a second communication platform based at least in part on content of the communication and device information provided by respective user devices of the one or more entities of the communication session, the communication including first content to be shared, via the communication session, to the one or more entities, and the device information indicating device capabilities for each user device of the user devices;

receiving, by the virtual reality device, a response including second content from a particular entity of the one or more entities to be shared to the one or more entities in the communication session, the response including the device information about a user device of the user devices used by the particular entity to provide the response;

determining, by the virtual reality device, an appropriate communication platform to associate with the particular entity for the communication session based at least in part on the response and the device information about the user device; and updating, by the virtual reality device, information associated with the communication session to enable subsequent communications, within the communications session, from the user to the particular entity to be transformed to the appropriate communication platform.

2. The computer-implemented method of claim 1, further comprising generating, by the virtual reality device, a data object representing the response in the communication session.

3. The computer-implemented method of claim 2, further comprising displaying the generated data object within a virtual reality environment displayed to the user interacting with the virtual reality device.

4. The computer-implemented method of claim 3, wherein
displaying the generated data object within the virtual reality environment comprises displaying the data object in a certain position of the virtual environment based at least in part on a content type associated with the data object.

5. A non-transitory computer-readable storage medium storing computer-executable instructions that, when executed by a computer system, configure the computer system to perform operations comprising:

maintaining a communication session between users, each user utilizing a different user device to participate in the communication session;

receiving first input, via a first communication platform, from a first user of the users intended to be shared in the communication session to the users;

determining a communication platform for each user of the users participating in the communication session based at least in part on device information provided by respective user devices of the users of the communication session and content of the first input, the device information indicating device capabilities for the respective user devices;

transforming the first input from a first media type of the first communication platform to one or more different media types of one or more different communication platforms corresponding to the determined communication platform for each user of the users participating in the communication session thereby enabling different user devices associated with the users to consume the content of the first input; and transmitting the transformed first input via the one or more different communication platforms to the users participating in the communication session.

6. The non-transitory computer-readable storage medium of claim 5, wherein the operations further comprise updating the communication session to enable subsequent input provided by the users within the communication session to utilize the one or more different communication platforms.

7. The non-transitory computer-readable storage medium of claim 5, wherein the operations further comprise maintaining user preferences that identify a preferred communication platform to utilize for subsequent content provided to the communication session based at least in part on different user devices.

8. The non-transitory computer-readable storage medium of claim 5, wherein transforming the first input from the first communication platform to the one or more different communication platforms comprises generating a data object of a different media type from the media type associated with the first input.

9. The non-transitory computer-readable storage medium of claim 5, wherein the operations further comprise initiating the communication session based at least in part on an external input device associated with a user device obtaining the first input from the first user, the user device associated with the first user.

10. The non-transitory computer-readable storage medium of claim 5, wherein the operations further comprise providing certain communications within the communication session to a social media platform.

11. The non-transitory computer-readable storage medium of claim 5, wherein receiving the first input from the first user comprises receiving the first input from the first user interacting with a virtual reality device.

12. The non-transitory computer-readable storage medium of claim 11, wherein the device information includes a user-specified context of the virtual reality device.

13. The non-transitory computer-readable storage medium of claim 5, wherein the device information includes a hardware identifier for the different user devices and application information of the different user devices.

14. A computer system comprising:
a memory configured to store computer-executable instructions;
a processor in communication with the memory configured to execute the computer-executable instructions to at least:
maintain a communication session that enables entities to communicate;
receive first input via a first device from an entity participating in the communications session;
identify a first media type of a first communication platform to associate with the entity based on device information corresponding to the first device and first content of the first input, the device information indicating device capabilities of the first device;
receive second input via a second device from the entity participating in the communication session;

identify a second media type of a second communication platform to associate with the entity based on the updated device information corresponding to the second device and second content of the second input, the updated device information indicating the device capabilities of the second device; and update the communication session such that subsequent input provided by the entities of the communication session are provided to the entity utilizing the second communication platform.

15. The computer system of claim 14, wherein the processor is further configured to maintain a timeline associated with the communication session that identifies when certain content was provided to the communication session.

16. The computer system of claim 14, wherein the communication session is configured to enable the entities to interact with certain content maintained in the communication session based at least in part on transitioning to a device capable of consuming the certain content.

17. The computer system of claim 14, wherein the processor is further configured to archive an original content type of certain content provided to the communication session and a transformed content type of the certain content provided to the entities of the communication session.

18. The computer system of claim 14, wherein the processor is further configured to display the subsequent input to the communication session according to a hierarchical content scheme that utilizes a type of content associated with the subsequent input to rank the display of the subsequent input.

19. The computer system of claim 14, wherein identifying the second communication platform to associate with the entity is further based at least in part on input and output device capabilities indicated by the updated device information.

20. The computer system of claim 14, wherein the processor is further configured to transmit a notification of the subsequent input provided by the entities of the communication session to the entities based at least in part on a contextual mode specified by each of the entities.

* * * * *